United States Patent
Segal et al.

(10) Patent No.: US 6,765,557 B1
(45) Date of Patent: Jul. 20, 2004

(54) REMOTE CONTROL HAVING TOUCH PAD TO SCREEN MAPPING

(75) Inventors: Jack A. Segal, Oxnard, CA (US); William Allen Yates, Camarillo, CA (US); Steven B. Branton, Ventura, CA (US); Jeff Mossontte, Oxnard, CA (US)

(73) Assignee: Interlink Electronics, Inc., Camarillo, CA (US)

( * ) Notice: Subject to any disclaimer, the term of this patent is extended or adjusted under 35 U.S.C. 154(b) by 0 days.

(21) Appl. No.: 09/546,417

(22) Filed: Apr. 10, 2000

(51) Int. Cl.⁷ .................................................. G09G 5/00
(52) U.S. Cl. ........................................ 345/173; 348/906
(58) Field of Search .................................. 345/173, 180, 345/182, 184, 1, 2, 169, 327, 328, 326, 864, 716, 717, 718; 348/734, 564, 569, 906; 178/18.01, 18.03, 18.05

(56) References Cited

U.S. PATENT DOCUMENTS

| | | |
|---|---|---|
| 4,293,734 A | 10/1981 | Pepper, Jr. |
| 4,455,452 A | 6/1984 | Schuyler |
| 4,825,209 A | 4/1989 | Sasaki et al. |
| 4,933,660 A | 6/1990 | Wynne, Jr. |
| 4,981,370 A | 1/1991 | Dziewit et al. |
| 4,988,982 A | 1/1991 | Rayner et al. |
| 5,031,214 A | 7/1991 | Dziewit et al. |
| 5,038,401 A | 8/1991 | Inotsume |
| 5,134,388 A | 7/1992 | Murakami et al. |
| 5,162,783 A | 11/1992 | Moreno |
| 5,163,091 A | 11/1992 | Graziano et al. |
| 5,191,613 A | 3/1993 | Graziano et al. |
| 5,208,736 A | 5/1993 | Crooks et al. |
| 5,250,929 A * | 10/1993 | Hoffman et al. |
| 5,311,207 A | 5/1994 | Kusumoto et al. |
| 5,450,079 A | 9/1995 | Dunaway |
| 5,545,857 A | 8/1996 | Lee et al. |
| 5,612,719 A | 3/1997 | Beernick et al. |
| 5,745,116 A | 4/1998 | Pisutha-Arnond |
| 5,748,185 A | 5/1998 | Stephan et al. |
| 5,777,605 A | 7/1998 | Yoshinobu et al. |
| 5,787,254 A | 7/1998 | Maddalozzo, Jr. et al. |
| 5,796,406 A | 8/1998 | Shigematsu et al. |
| 5,798,758 A | 8/1998 | Harada et al. |
| 5,809,267 A | 9/1998 | Moran et al. |
| 5,818,425 A | 10/1998 | Want et al. |
| 5,825,352 A | 10/1998 | Bisset et al. |
| 5,862,256 A | 1/1999 | Zetts et al. |
| 5,864,635 A | 1/1999 | Zetts et al. |
| 5,880,411 A | 3/1999 | Gillespie et al. |
| 5,889,236 A | 3/1999 | Gillespie et al. |
| 5,905,497 A * | 5/1999 | Vaughan et al. ............ 345/327 |
| 5,909,211 A | 6/1999 | Combs et al. |
| 5,917,475 A | 6/1999 | Kuzunuki et al. |

(List continued on next page.)

OTHER PUBLICATIONS

Infrared Remote Control Transcoder, Jul. 1983, pp. 317–322.

Primary Examiner—Chanh Nguyen
(74) Attorney, Agent, or Firm—Brooks Kushman P.C.

(57) ABSTRACT

A remote control for controlling a home entertainment (HE) device such as an Interactive television having a display screen. The remote control includes a touch pad mapped to the display screen of the HE device as a function of the ratio of the areas of the touch pad and the display screen such that each location of the touch pad corresponds to a respective location of the display screen. The remote controller further includes a controller operable with the touch pad to enable a control function associated with a location of the display screen in response to the corresponding location of the touch pad being touched for controlling the HE device. The display screen may include on-screen keyboards, control panels and menus, an Internet page, an electronic program guide, and the like.

5 Claims, 13 Drawing Sheets

U.S. PATENT DOCUMENTS

| | | | |
|---|---|---|---|
| 5,943,044 A | | 8/1999 | Martinelli et al. |
| 5,956,019 A | | 9/1999 | Bang et al. |
| 5,956,025 A | * | 9/1999 | Goulden et al. ............ 345/169 |
| 5,990,893 A | | 11/1999 | Numazaki |
| 6,005,549 A | | 12/1999 | Forest |
| 6,029,214 A | * | 2/2000 | Dorfman et al. ............ 345/173 |
| 6,061,097 A | * | 5/2000 | Satterfield .................... 725/44 |
| 6,229,541 B1 | * | 5/2001 | Kamen et al. .............. 345/328 |
| 6,411,307 B1 | * | 6/2002 | Rosin et al. ................ 345/716 |
| 2001/0035860 A1 | * | 11/2001 | Segal et al. ................ 345/173 |

* cited by examiner

REMOTE CONTROL HAVING TOUCH PAD TO SCREEN MAPPING

TECHNICAL FIELD

The present invention generally relates to remote controls for controlling home entertainment devices and, more particularly, to a remote control having a touch pad mapped to the screen of a home entertainment (HE) device to create a virtual touch screen for enabling an operator to control the HE device.

BACKGROUND ART

Other than being remote, typical home entertainment (HE) device remote controls are generally despised by human operators for a variety of reasons. Typical HE remote controls are based on a button-centric paradigm and usually contain too many buttons. This crowded geography causes considerable confusion and intimidation and makes it difficult to find the desired button. It is often dark in the room in which HE remote controls are used. This makes it difficult or impossible to read the legends on the crowded button layout.

Normal HE viewing takes place at a distance of two meters or more and the display being viewed is usually quite large such as a television (TV). The legends on HE remote controls are usually twelve point type or smaller. For many operators, changing viewing distance requires changing glasses or putting on reading glasses.

Some remote controls have a trackball or button pointing device to control a cursor on a TV screen. This approach has drawbacks in that the low resolution of normal TVs requires a cursor that is large. The cursor also moves in a jerky style because of the low refresh rate of the TV screen. Other remote controls have tried to solve the problems associated with typical remote controls by using a display in the remote control. The display is changed as required. However, the local display brings with it a new set of problems. An operator has to read the display then press the appropriate area to select an item or another menu. The display also is costly and requires programming for each system or bi-directional communications.

Enhanced or interactive TV and related applications require the extensive use of graphic user interfaces (GUIs) and on-screen displays/menus. An enhanced TV is a TV configured for cable video programming, Internet browsing, Internet telephony, electronic mail, video cassette recording, audio programming, and the like. The operator has to navigate through various menus to use the enhanced TV. Using up, down, right, and left arrow keys to navigate these menus is difficult, slow, and frustrating. The increasing number of television channels has given rise to the electronic programming guide (EPG). Because an EPG is a dense grid of selections, using arrow keys to navigate is even more difficult.

Interactive TV also requires text and graphics entry. The current solution for text entry, a wireless keyboard, is undesirable in a living room because many people cannot type, the keyboard does not fit the decor of the living room, there is no place to set the keyboard down to type on it, and people simply refuse to have computer related material in living rooms. In addition, typing is associated with work and is not desired to be in a room devoted to relaxation.

What is needed is a remote control having a touch pad mapped to an HE device display screen to create a virtual touch screen for enabling an operator to control the HE device. In effect, the touch pad would provide an operator with the ability to virtually touch the HE device display screen to control the HE device without having to actually physically touch the HE device. Touching the HE device display screen to control the HE device is the most intuitive interface. Further, the advantages of using a touch pad to control the HE device include allowing the operator to not need to look at the remote control during operation.

SUMMARY OF THE INVENTION

Accordingly, it is an object of the present invention to provide a remote control having a touch pad mapped to a home entertainment (HE) device display screen to create a virtual touch screen for enabling an operator to control the HE device without looking at the remote control.

It is another object of the present invention to provide a remote control having a touch pad mapped to a control panel displayed on the HE device display screen such that each location of the touch pad corresponds to a respective portion of the control panel.

It is a further object of the present invention to provide a remote control having a touch pad mapped to an on-screen keyboard displayed on the HE device display screen such that each location of the touch pad corresponds to a respective entry of the on-screen keyboard.

It is still another object of the present invention to provide a remote control having a touch pad mapped to an electronic program guide (EPG) displayed on the HE device display screen such that each location of the touch pad corresponds to a grid area of the EPG.

It is still a further object of the present invention to provide a remote control having a touch pad mapped to an Internet page displayed on the HE device display screen such that each location of the touch pad corresponds to a link of the Internet page.

It is still yet another object of the present invention to provide a remote control having a touch pad and control buttons used in conjunction to enable control functions for controlling an HE device.

It is still yet a further object of the present invention to provide a remote control having a touch pad mapped to a graphical entry screen such that each location of the touch pad corresponds to a respective location of the graphical entry screen.

In carrying out the above objects and other objects, an embodiment of the present invention provides a remote control and an associated method for controlling a home entertainment (HE) device having a display screen. The remote control includes a touch pad mapped to the display screen of the HE device as a function of the ratio of the areas of the touch pad and the display screen such that each location of the touch pad corresponds to a respective location of the display screen. The remote controller further includes a controller operable with the touch pad to enable a control function associated with a location of the display screen in response to the corresponding location of the touch pad being touched for controlling the HE device. The display screen may include on-screen keyboards, control panels and menus, an Internet page, an electronic program guide, and the like.

Further, in carrying out the above objects and other objects, the present invention provides a remote control for controlling a television. The remote control includes a touch pad and a plurality of control buttons. The touch pad and the control buttons are used in conjunction to enable control functions for controlling the television.

These and other features, aspects, and embodiments of the present invention will become better understood with regard to the following description, appended claims, and accompanying drawings.

BEST MODES FOR CARRYING OUT THE INVENTION

Figure 1:
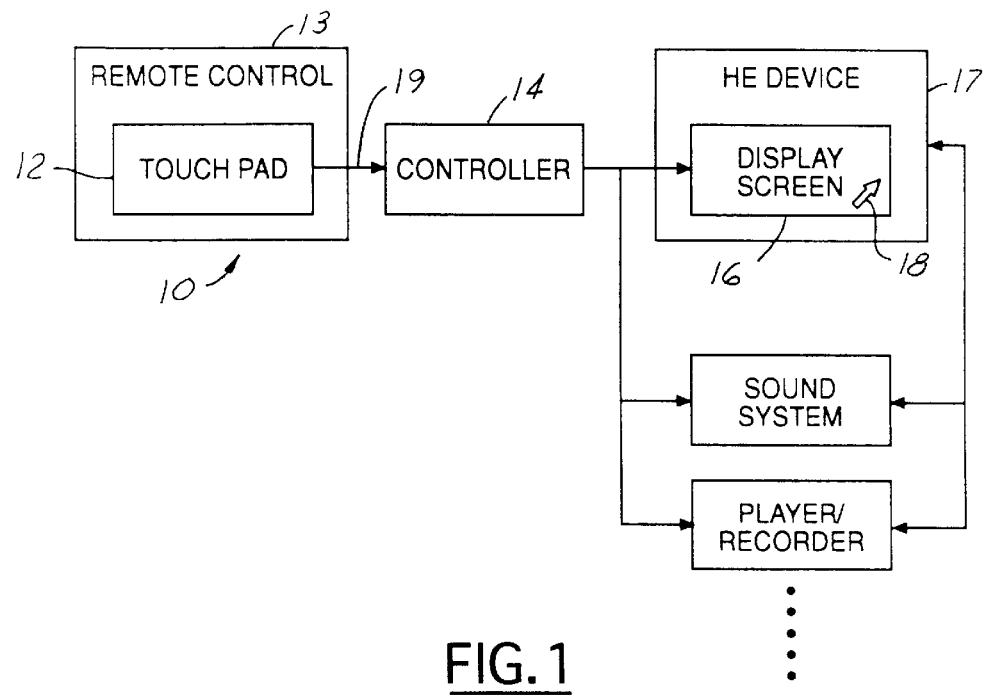
FIG. 1 illustrates a block diagram of a remote control for controlling a home entertainment (HE) device in accordance with the present invention.

Referring now to FIG. 1, a block diagram of a remote control system 10 for controlling a home entertainment (HE) device in accordance with the present invention is shown. HE remote control system 10 includes a touch pad 12 on a remote control 13, a controller 14, and a display screen 16. Touch pad 12 includes a touch pad surface area for an operator to touch. Touch pad 12 generates a signal in response to touching by an operator on the touch pad. The signal is indicative of the location of the touch on touch pad 12. The signal may also be indicative of the duration and the pressure of the touch on touch pad 12 for each location being touched.

Touch pad 12 is operable with display screen 16 such that the area of the touch pad is absolutely mapped to the area of the display screen. This means that each portion of touch pad 12 corresponds to a respective portion of display screen 16. For instance, the upper left portion of touch pad 12 corresponds to the upper left portion of display screen 16. Similarly, the middle bottom portion of touch pad 12 corresponds to the middle bottom portion of display screen 16. Touch pad 12 is in an absolute mode when the area of the touch pad is absolutely mapped to the area of display screen 16.

In operation, the area of touch pad 12 is mapped to various control panels and menus displayed on display screen 16. This allows the operator to manipulate touch pad 12 to select control function entries of the panels and menus displayed on display screen 16 while remaining visually focused on the display screen.

Preferably, display screen 16 has a much larger area than the area of touch pad 12. The absolute mapping between touch pad 12 and display screen 16 is scaled as a function of the ratio of the areas. Display screen 16 is preferably some or all of the display screen area of a HE device 17 such as a television (TV) screen, monitor, computer screen, or the like. HE device is part of an HE system that may include other HE devices such as a sound system, a player/recorder and the like. Display screen 16 may include a movable object such as a cursor 18 for touch pad 12 to operate in a relative mode. Display screen 16 may be separated from HE device and coupled directly to touch pad 12.

Controller 14 is operable with touch pad 12 for receiving a signal 19 from the touch pad in response to an operator touching the touch pad. In the absolute mode, controller 14 highlights a portion of display screen 16 in response to a corresponding portion of touch pad 12 being touched. Controller 14 highlights a portion of display screen 16 to enable a control function corresponding to the highlighted portion of the display screen for controlling the HE device. Instead of highlighting portions of display screen 16, controller 14 may user color change, outlining, or other ways of distinguishing the selected portions of display screen 16. To enable touch pad to display screen mapping, remote control system 10 generally includes the following hardware: touch pad 12, communications, receiver, driver level software, video source selector, video overlay generator, and video to TV converter as is known in the art.

In the relative mode, controller 14 moves cursor 18 on display screen 16 to the location on display screen corresponding to the location of the touch on touch pad 12 in response to an operator touching the touch pad. Controller 14 controls the HE device to enable a control function corresponding to the location of cursor 18 on display screen 16 in response to an operator touching touch pad 12. Controller 14 may be coupled directly or remotely located from touch pad 12. Typically, touch pad 12 transmits infrared (IR) or radio frequency (RF) signals to communicate with controller 14. Traditional pointing devices such as a computer mouse use relative pointing letting the operator move a cursor from one place to another place on a display screen.

In the absolute mode, controller 14 highlights the portion of display screen 16 corresponding to the respective portion of touch pad 12 being touched independent of the display screen portion highlighted prior to the touch pad being touched. Wherever the operator touches touch pad 12 the corresponding portion of display screen 16 is highlighted regardless of where the operator touched the touch pad previously. That is, the touching movement on touch pad 12 is mapped absolutely on to display screen 16.

Figure 2:
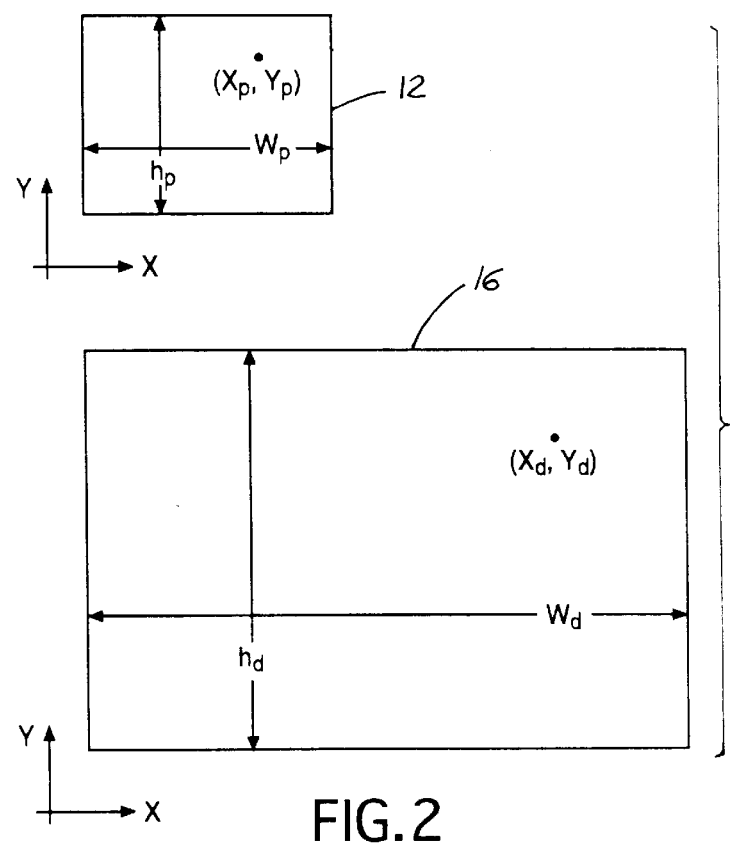
FIG. 2 illustrates the absolute position mapping of the touch pad with respect to the display screen of the HE device in accordance with the present invention.

Referring now to FIG. 2, the absolute position mapping of touch pad 12 with respect to display screen 16 will now be described in further detail. As mentioned above, touch pad 12 is operable with display screen 16 such that the area of the touch pad is absolutely mapped to the area of either a portion of the display screen or the entire display screen. As an example, it will be assumed that the area of touch pad 12 is absolutely mapped to the entire area of display screen 16. Thus, each point of touch pad 12 has a corresponding absolute point on display screen 16. Touch pad 12 has an area defined by a width $w_p$ and a height $h_p$. Display screen 16 has an area defined by a width $w_d$ and a height $h_d$. A selected point of touch pad 12 such as point $x_p$, $y_p$ has a corresponding absolute point $x_d$, $y_d$. The corresponding absolute point $x_d$, $y_d$ of display screen 16 is related to the selected point $x_p$, $y_p$ of touch pad 12 in accordance with the following equations:

$$x_d = x_p * (w_d/w_p)$$

$$y_d = y_p * (h_d/h_p)$$

That is, the x coordinate of the corresponding absolute point of display screen 16 ($x_d$) is equal to the x coordinate of the selected point of touch pad 12 ($x_p$) multiplied by the ratio between the widths of the display screen ($w_d$) and the touch pad ($w_p$). Similarly, the y coordinate of the corresponding absolute point of display screen 16 ($y_d$) is equal to the y coordinate of the selected point of touch pad 12 ($y_p$) multiplied by the ratio between the heights of the display screen ($h_d$) and the touch pad ($h_p$). As a result, each point of touch pad 12 has a corresponding absolute point on display screen 16.

If touch pad 12 is mapped to only a portion of the entire area of display screen 16 then the x coordinate of the corresponding absolute point of the portion of the display screen ($x_d$) is equal to the x coordinate of the selected point of touch pad 12 ($x_p$) multiplied by the ratio between the widths of the portion of the display screen and the touch pad. The y coordinate of the corresponding absolute point of the portion of display screen 16 ($y_d$) is equal to the y coordinate of the selected point of touch pad 12 ($y_p$) multiplied by the ratio between the heights of the portion of the display screen and the touch pad.

Figure 3:
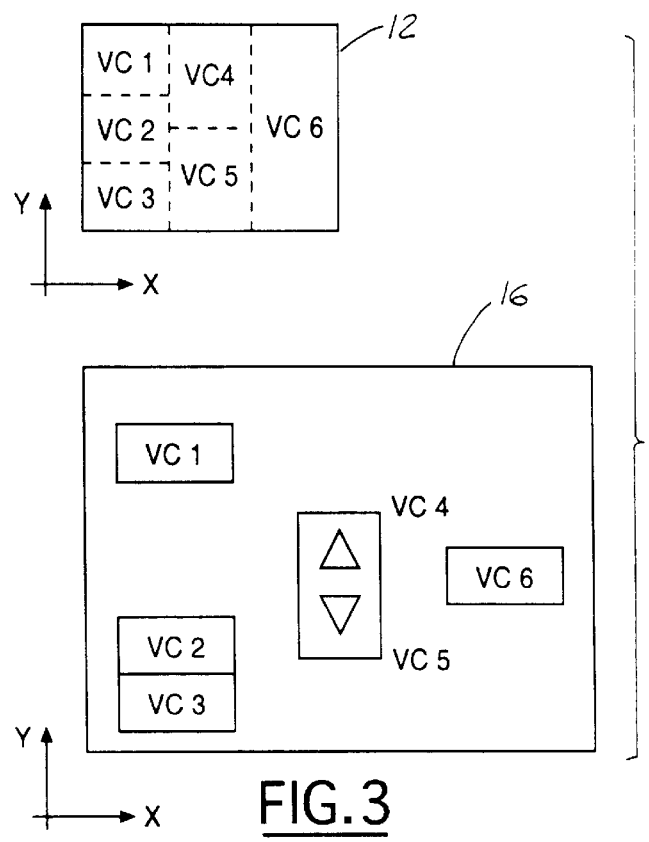
FIG. 3 illustrates the absolute control mapping of the touch pad with respect to the display screen in accordance with the present invention.

Referring now to FIG. 3, the absolute control mapping of touch pad 12 with respect to display screen 16 will now be described in further detail. As mentioned above, the area of touch pad 12 is mapped to various control panels and menus displayed on display screen 16. This allows the operator to manipulate touch pad 12 to select control function entries of the panels and menus displayed on display screen 16 while remaining visually focused on the display screen. The area of touch pad 12 is broken down into a plurality of virtual control areas (VC1, VC2, etc.). Display screen 16 (or a portion of the display screen) displays a plurality of virtual controls (VC1, VC2, etc.). Each virtual control area of touch pad 12 corresponds to a respective virtual control of display screen 16. For instance, virtual control area VC1 of touch pad 12 corresponds to virtual control VC1 of display screen 16 and virtual control area VC2 of the touch pad corresponds to virtual control VC2 of the display screen.

The entire area of touch pad 12 is mapped to virtual controls displayed on display screen 16 such that each point of the touch pad corresponds to a virtual control displayed on the display screen. Each virtual control area of touch pad 12 corresponds to a respective virtual control of display screen 16 as a function of the positions of the virtual control areas on the touch pad and the positions of the virtual controls on the display screen. For instance, virtual control area VC1 of touch pad 12 is in the upper left corner of the touch pad and corresponds to virtual control VC1 of display screen 16 located in the upper left corner of the display screen. Virtual control area VC6 of touch pad is in the right side of touch pad 12 and corresponds to virtual control VC6 of display screen 16 located in the right side of the display screen.

There are three virtual controls in the left side of display screen 16 (VC1, VC2, and VC3) so the left side of touch pad 12 includes three corresponding virtual control areas (VC1, VC2, and VC3). There are two virtual controls in the middle of display screen 16 (VC4, VC5) so the middle of touch pad 12 includes two corresponding virtual control areas (VC4, VC5). Finally, there is one virtual control in the right side of display screen 16 (VC6) so the right side of touch pad 12 includes one corresponding virtual control area (VC6).

In operation, the operator touches a point of touch pad 12 falling within a certain virtual control area. In response, the virtual control of display screen 16 corresponding to the certain virtual control area is selected or actuated. HE device 17 is then controlled as a function of the selected control.

Referring now to FIGS. 4 through 17, the operation of remote control system 10 in a typical enhanced TV environment will now be described according to an embodiment of the present invention. An enhanced TV is a TV system configured for cable video programming, Internet browsing, telephony, email messaging, video cassette recording (VCR), audio programming, and the like.

Figure 4:
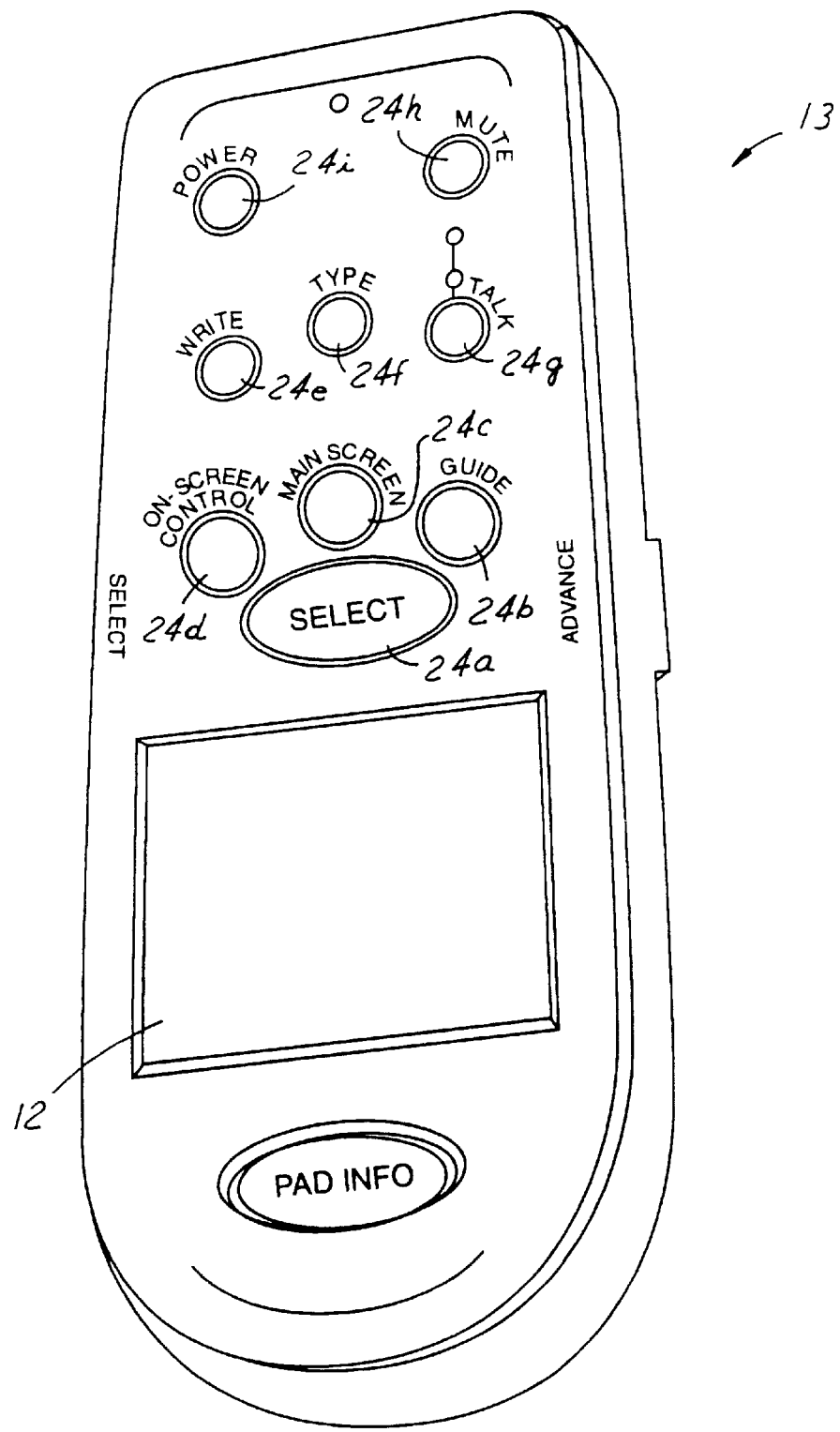
FIG. 4 illustrates a perspective view of a remote control for controlling HE devices in accordance with the present invention.

A perspective view of a remote control 13 for controlling HE devices in accordance with the present invention is shown in FIG. 4. Remote control 13 includes a touch pad 12 and a plurality of control buttons 24. An operator uses touch pad 12 and control buttons 24 in conjunction to operate with controller 14 for selecting a control function for controlling a HE device. In general, an operator uses touch pad 12 to highlight a selected portion of display screen 16. The operator then uses control buttons 24 to select the highlighted portion of display screen 16. Control buttons 24 include a select button 24*a*, an on-screen control button 24*b*, a main screen button 24*c*, an electronic program guide button 24*d*, a write button 24*e*, a type button 24*f*, a talk button 24*g*, a volume mute button 24*h*, and a power button 24*i*.

Figure 5A:
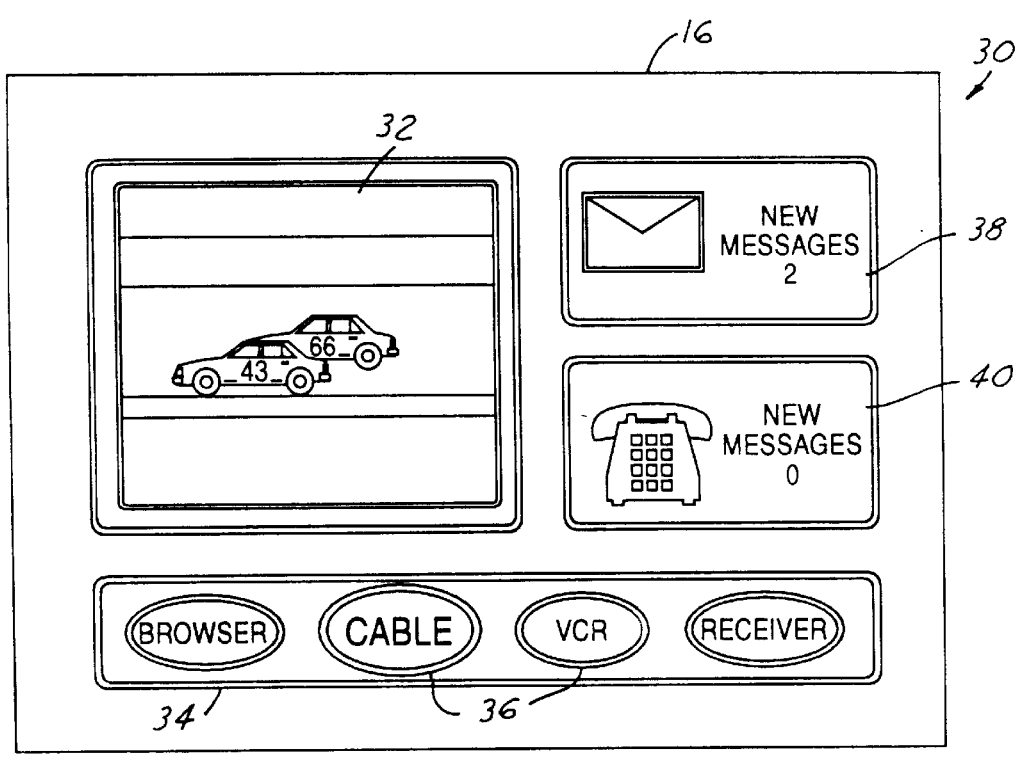
FIG. 5A illustrates a main menu displayed on the display screen of the HE device.

FIG. 5A illustrates a main menu 30 having a plurality of virtual controls displayed on display screen 16 of the HE device. Main menu 30 includes a visual panel 32 for visually showing a video image on the HE device. For instance, visual panel 32 shows cable or video programming. Main menu 30 further includes an HE device operating panel 34. HE device operating panel 34 includes a plurality of mode buttons 36. Main menu 30 further includes an electronic mail (email) panel 38 and an Internet telephony panel 40.

Each of mode buttons 36 corresponds to a mode of the HE device. For instance, modes of the HE device include an Internet browser mode, a cable mode, a VCR mode, and an audio receiver mode. In the Internet browser mode, the HE device functions as an access device for Internet communications. For Internet communications the entire area of display screen 16 displays Internet pages. In the cable mode, the HE device functions as a television for receiving video/audio cable programming. For cable programming the entire area of display screen 16 displays video cable programming. In the VCR mode, the HE device functions as a VCR and the entire area of display screen 16 shows video programming. In the audio receiver mode, the HE device functions as a stereo receiver for playing audio signals. In FIG. 5A, the HE device is in the cable mode as evidenced by cable mode button 36 being bigger than the other mode buttons 36. Visual panel 32 displays cable programming of a selected cable channel for the operator to view.

Figure 5B:
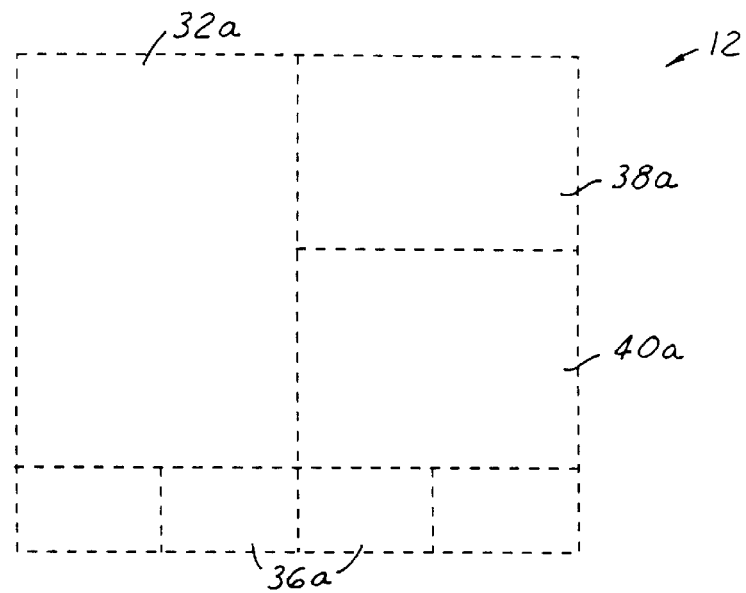
FIG. 5B illustrates the virtual control areas of the touch pad corresponding to the controls of the main menu displayed on the display screen of the HE device.

Referring now to FIG. 5B with continual reference to FIG. 5A, the area of main menu 30 is mapped to the area of touch pad 12. Each portion of main menu 30 corresponds to a respective portion of touch pad 12. The operator touches touch pad 12 using a finger or a stylus to highlight panels 32, 34, 38, and 40 of display screen 16. For instance, the operator touches virtual control area 32*a* in the upper left portion of touch pad 12 to highlight visual panel 32, virtual control areas 36*a* in the bottom portion of the touch pad to highlight operating panel 34, virtual control area 40*a* in the mid right portion of the touch pad to highlight Internet telephony panel 40, and virtual control area 38*a* in the upper right portion of the touch pad to highlight email panel 38.

When the operator touches a portion of touch pad 12 the panel closest to the corresponding touched portion of the touch pad is highlighted. If the operator moves his finger on touch pad 12 from a first panel towards a second panel the second panel is highlighted as soon as the operator's finger is closer to the second panel than to the first panel. To activate a panel the operator may either press select button 24*a* of remote control 13, press harder on touch pad 12, depress hard enough to activate a switch under the touch pad, quickly tap on touch pad, or the like.

Figure 6:
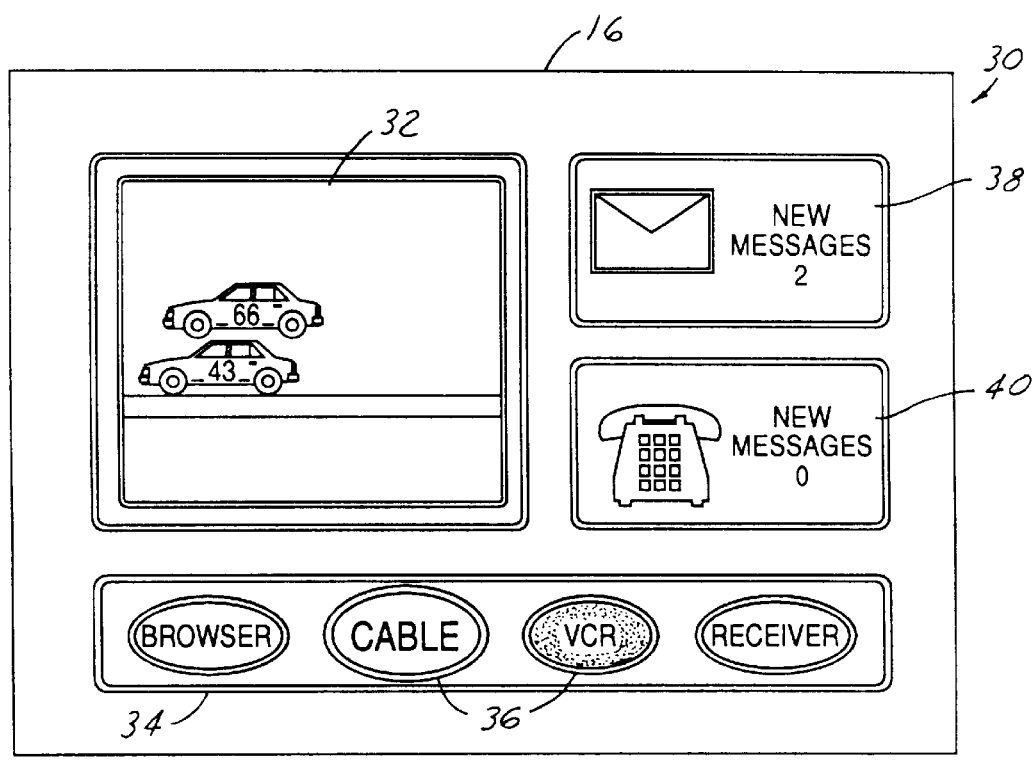
FIG. 6 illustrates the main menu having a highlighted VCR mode button.

FIG. 6 illustrates main menu 30 having a highlighted VCR mode button 36. In addition to highlighting panels 32, 34, 38, and 40 of main menu 16, an operator may highlight a mode button 36 of operating panel 34 by touching the portion of touch pad 12 corresponding to the location of the mode button on display screen 16. For example, if the operator touches the bottom middle right portion of touch pad 12, then VCR mode button 36 is highlighted as shown in FIG. 6. The operator may then select the highlighted VCR mode button 36 by pressing select button 24*a* on remote control 13. The entire display screen 16 then displays VCR programming in place of main menu 30 (not shown).

Upon selecting cable mode button 36, display screen 16 replaces main menu 30 with video cable programming. For instance, the entire area of display screen 16 displays a video picture and functions like a typical TV screen. While viewing the video cable programming the operator may desire to know which other programs are being provided on other cable channels. An electronic program guide (EPG) is a channel guide that enables a user to view a listing of the programs provided on the cable channels. The operator may access an EPG by pressing guide button 24*d* on remote control 13 or a virtual control on display screen 16.

Figure 7A:
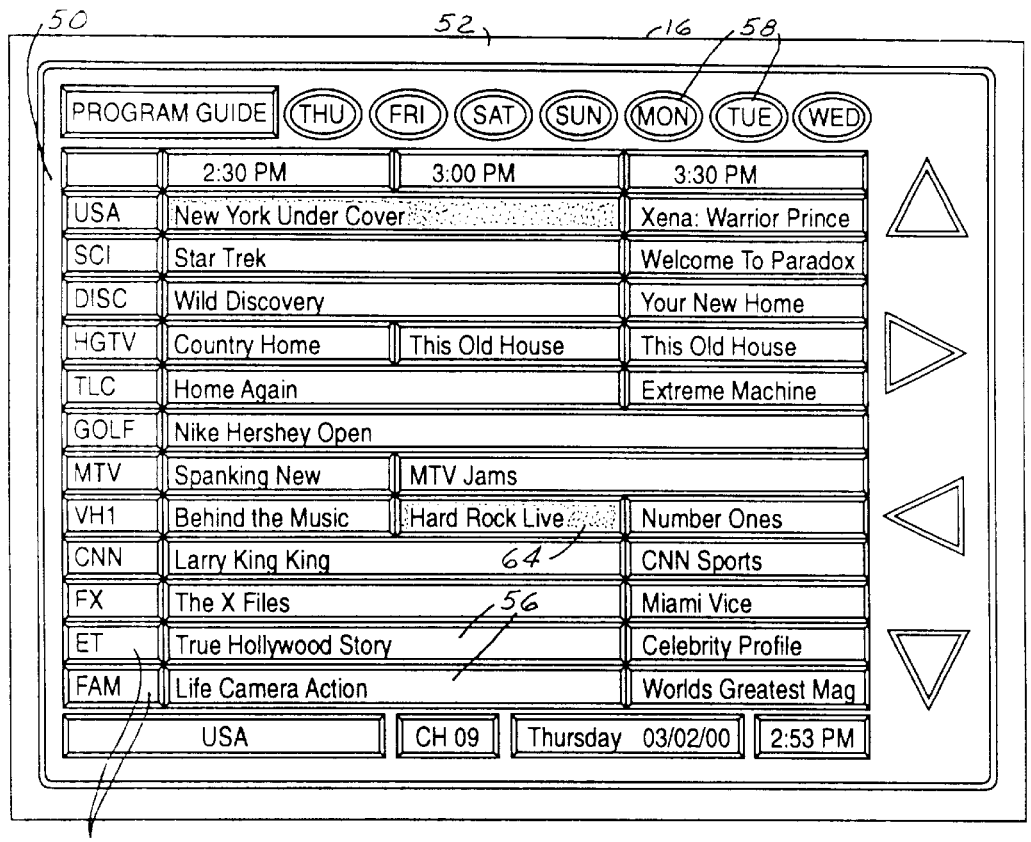
FIG. 7A illustrates an electronic program guide (EPG) displayed on the display screen of the HE device when the HE device is in the cable programming mode.

In response to guide button 24*d* being pressed display screen 16 displays an EPG 50 over cable video programming screen 52 as shown in FIG. 7A. Cable programming screen 52 displays the cable program. EPG 50 includes a plurality of grids such as channel grids 54 for listing cable channels and program title grids 56 for listing programs associated with the cable channels during given times. Highlighted program title grid 62 identifies the program playing on cable video programming screen 52. EPG 50 further includes day grids 58 for the operator to select a day to view the available programs for the selected day. EPG 50 further includes arrow keys 60 to move sets of grids of the EPG up and down or sideways.

Figure 7B:
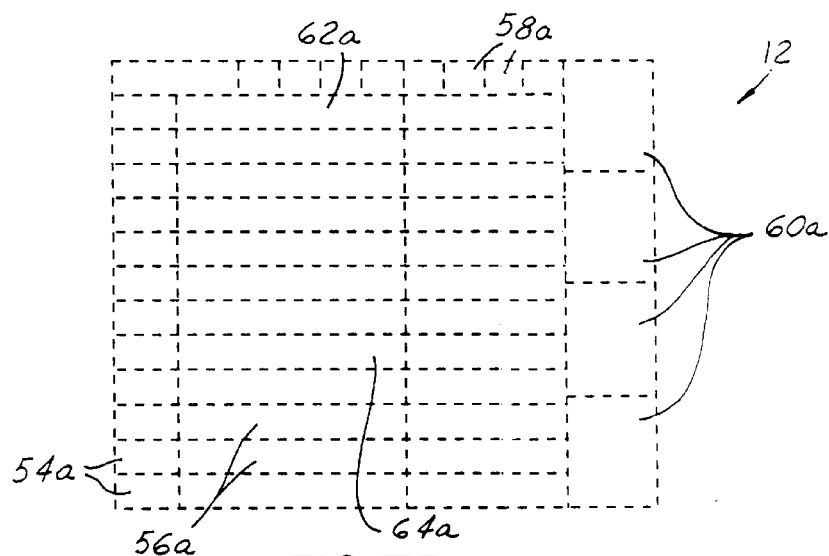
FIG. 7B illustrates the virtual control areas of the touch pad corresponding to the grid areas of the EPG displayed on the display screen of the HE device.

Referring now to FIG. 7B with continual reference to FIG. 7A, the virtual control areas of touch pad 12 is mapped absolutely to EPG 50 and each grid of EPG 50 corresponds to a respective portion of touch pad 12. The operator touches a portion of touch pad 12 to highlight the corresponding grid of EPG 50. For example, the operator touches a virtual control area 54*a* in the left hand side of touch pad 12 to highlight a corresponding channel grid 54 of EPG 50. The operator may touch a virtual control area 56*a* of touch pad 12 to highlight a corresponding program title grid 56 of EPG 50. Similarly, virtual control areas 58*a*, 60*a*, 62*a*, and 64*a* are mapped to corresponding grids of EPG 50. As the operator touches different portions of touch pad 12 the corresponding grids of EPG 50 are highlighted.

In operation, the operator may touch virtual control area 64*a* in the middle portion of touch pad 12 to highlight program title grid 64. The operator may then select the program of program title grid 64 to view the program by pressing select button 24*a* of remote control 13. In response to program title grid 64 being selected the cable channel is changed to the associated channel and the program of program title grid 64 is displayed on the entire display screen 16. Concurrently, EPG 50 disappears from display screen 16. Instead of selecting the program of program title grid 64 to view the program the operator may select program title grid 64 to view information associated with the program by pressing guide button 24*d* of remote control 13. The information may include a description of the program, running time, and the like.

Figure 8A:
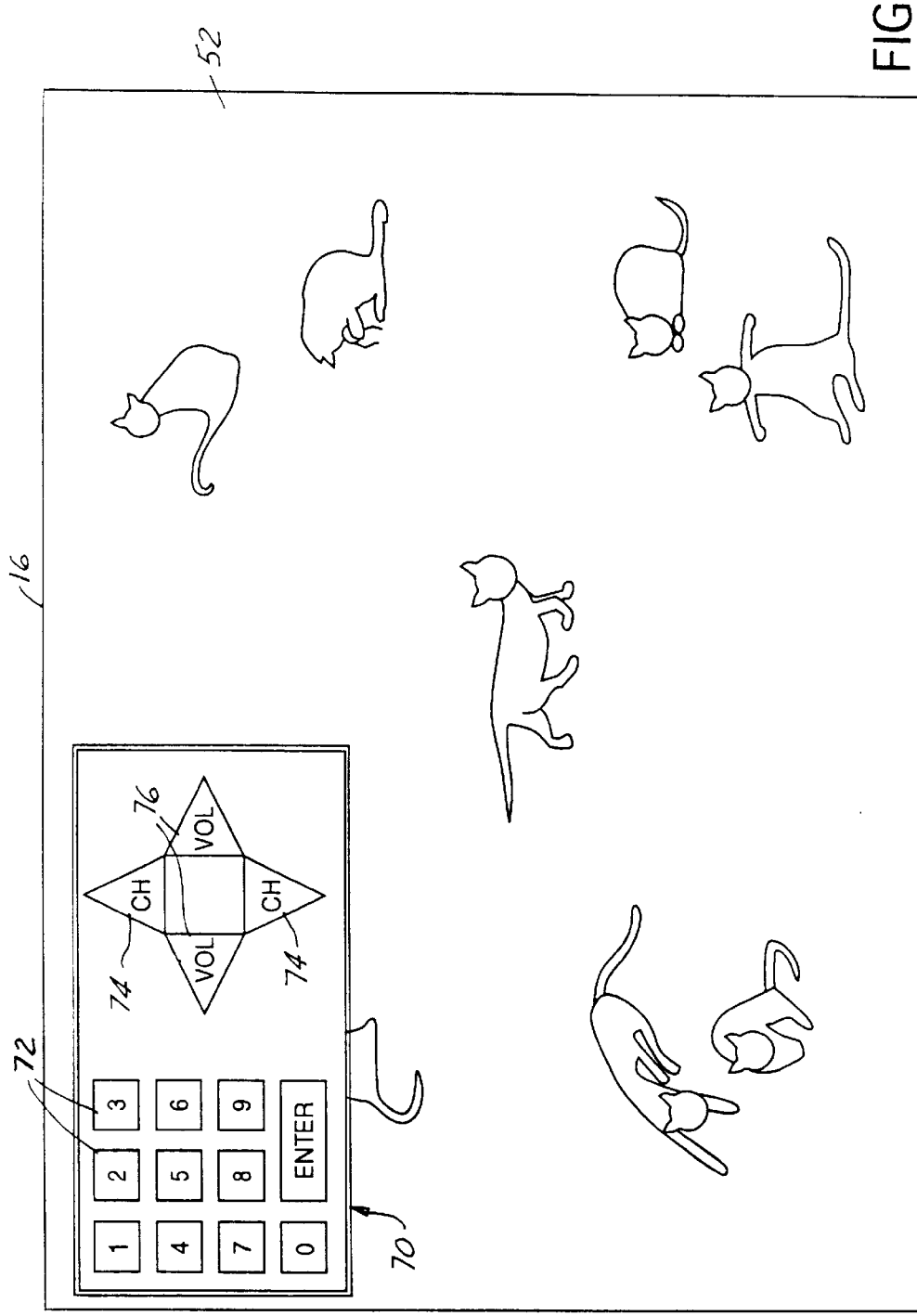
FIG. 8A illustrates a cable program and cable control panel displayed on the display screen of the HE device when the HE device is in the cable programming mode.

FIG. 8A illustrates a cable program being displayed on cable video programming screen 52 of display screen 16. While viewing the cable program on cable video programming screen 52 the operator may access an on-screen control panel 70 by selecting on-screen control button 24*b* of remote control 13. On-screen control panel 70 includes a numerical key pad 72, cable channel control arrows 74, and volume control arrows 76.

Figure 8B:
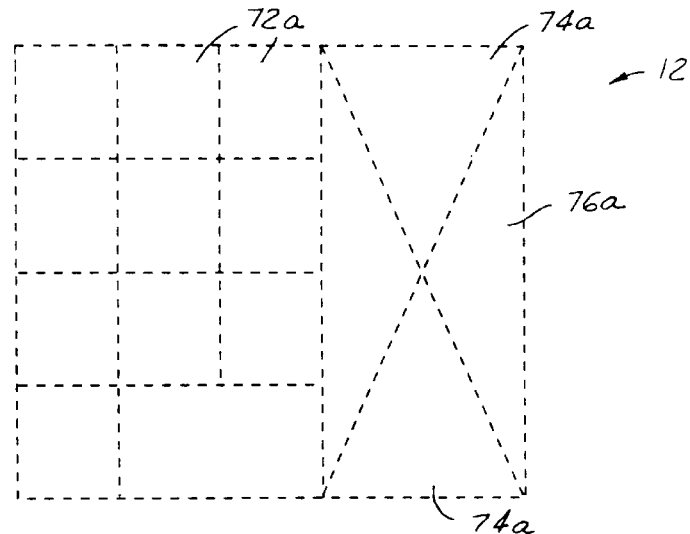
FIG. 8B illustrates the virtual control areas of the touch pad mapped absolutely to the cable control panel displayed on the display screen of the HE device.

Referring now to FIG. 8B with continual reference to FIG. 8A, the virtual control areas of touch pad 12 is mapped absolutely to on-screen control panel 70 and each portion of the on-screen control panel corresponds to a respective portion of the touch pad. The operator touches a portion of touch pad 12 to highlight the corresponding portion of on-screen control panel 70. For example, the operator touches a virtual control area 72a of touch pad 12 to highlight numerical entry "6" of numerical key pad 72 of on-screen control panel 70. Similarly, virtual control areas 74a and 76a are mapped to corresponding to cable channel control arrows 74 and volume control arrows 76 of on-screen control panel 70. As the operator touches different portions of touch pad 12 the corresponding portions of on-screen control panel 70 are highlighted. The operator then highlights the "ENTER" entry of on-screen control panel 70 or presses select button 24a of remote control 13 to select cable channel "6".

The operator may use numerical key pad 72 of on-screen control panel 70 to change the cable channel to view programming of another channel. The operator may use cable channel control arrows 74 to sequentially change the cable channels. The operator may use volume control arrows 76 to raise and lower the volume.

At any time the operator may access main menu 30 by pressing main screen control button 24b of remote control 13. From main menu 30 the operator may select other HE device modes using operating panel 34. For example, the operator may select a player/recorder mode button 36 in operating panel 34 to permit control system 10 to access a player/recorder such as a tape device, VCR, optical disk drive, magnetic disk drive, or the like. For example, FIG. 7 illustrates a VCR program being displayed on video programming screen 52 of display screen 16 while the HE device is in the VCR mode.

While viewing the video program on video programming screen 52 the operator may access an on-screen VCR control panel 80 by selecting on-screen control button 24b of remote control 13. On-screen VCR control panel 80 includes VCR control buttons 82 such as "PLAY", "STOP", and the like. The area of touch pad 12 is mapped absolutely to the area of on-screen VCR control panel 80. Each VCR control button 82 of on-screen VCR control panel 80 corresponds to a respective portion of touch pad 12. The operator touches a portion of touch pad 12 to highlight the corresponding VCR control button 82 of on-screen VCR control panel 80. For example, the operator touches the middle portion of touch pad 12 to highlight the "REW" VCR control button 82 of on-screen VCR control panel 80. As the operator touches different portions of touch pad 12 the corresponding VCR control buttons 82 of on-screen VCR control panel 80 are highlighted. In response to the operator selecting a VCR control button 82 the HE device performs the VCR control function associated with the selected VCR control button 82.

In addition to using on-screen controls 70 and 80 for enabling TV and VCR control functions, the operator may perform gestures on touch pad 12 to enable the same TV and VCR control functions. A gesture performed on touch pad 12 is a stroke on the touch pad that corresponds to an understood or recognizable pattern. In response to a gesture performed on touch pad 12, the touch pad generates a gesture signal. The gesture signal is indicative of the gesture performed on touch pad 12. Each gesture performed on touch pad 12 corresponds to a HE device control function. Controller 14 is operable with touch pad 12 for receiving a gesture signal from the touch pad in response to an operator performing a gesture on the touch pad. In response to an operator performing a gesture on touch pad 12 controller 14 controls the HE device to enable the control function corresponding to the gesture performed on the touch pad.

Gestures may be alphanumeric characters traced on touch pad 12. For instance, an operator may trace "9" on touch pad 12 to change the television channel to channel "9". The operator may also trace "M" to mute the volume of the television or trace "P" to play the VCR. Gestures may also be a stroke across touch pad 12. For example, a stroke from the right to the left of touch pad 12 followed by a hold on the touch pad may correspond to a control function for turning up the volume of the television. A gesture may be a tap on touch pad 12. This gesture may correspond to stopping the VCR.

Using gestures to control HE devices has many advantages. The operator has access to commands with no need to look at remote control 13. Gestures decrease the number of buttons needed on remote control 13. Remote control 13 can be upgraded simply by adding recognizable gestures. Hardware changes are not required meaning that there is no need to add, subtract, or change physical buttons or legends.

In the Internet browser mode, the HE device functions as an access device for Internet communications and display screen 16 displays an Internet page 90 as shown in FIG. 8. In the Internet browser mode, a cursor 91 is displayed on Internet page 90 to enable the operator to navigate through the Internet page. Because the area of an Internet page is typically bigger than the area of a display screen touch pad 12 is used in a relative mode when the HE device is in the Internet browser mode. In the relative mode, the operator moves cursor 91 by moving his finger across touch pad 12. Controller 14 moves cursor 91 to the location on Internet page 90 corresponding to the location of the touch on touch pad 12 in response to an operator touching the touch pad.

Touch pad 12 may also function in the absolute mode when the HE device is in the Internet browser mode. In the absolute mode, the area of touch pad 12 is mapped absolutely to the area of Internet page 90. Each portion of Internet page 90 corresponds to a respective portion of touch pad 12. The operator highlights links on the Internet page 90 by moving his finger to the corresponding portion of touch pad 12. The operator may then select a highlighted link by using select button 24a of remote control 13.

While viewing Internet page 90 the operator may access an on-screen keyboard 92 by selecting on-screen control button 24b of remote control 13. On-screen keyboard 92 includes the alphanumeric keys found on a typical computer keyboard. The area of touch pad 12 is mapped absolutely to the area of on-screen keyboard 92. Each key of on-screen keyboard 92 corresponds to a respective portion of touch pad 12. The operator touches a portion of touch pad 12 to highlight the corresponding key of on-screen keyboard 92. For example, the operator touches the upper right portion of touch pad 12 to highlight key "P" of on-screen keyboard 92. As the operator touches different portions of touch pad 12 the corresponding keys of on-screen keyboard 92 are highlighted. On-screen keyboard 92 enables the operator to enter text into the input areas of Internet page 90. To enter text, the operator highlights a key and then presses the select button 24a of remote control 13. Controller 14 then enters the selected text into the input area of Internet page 90.

Figure 9:
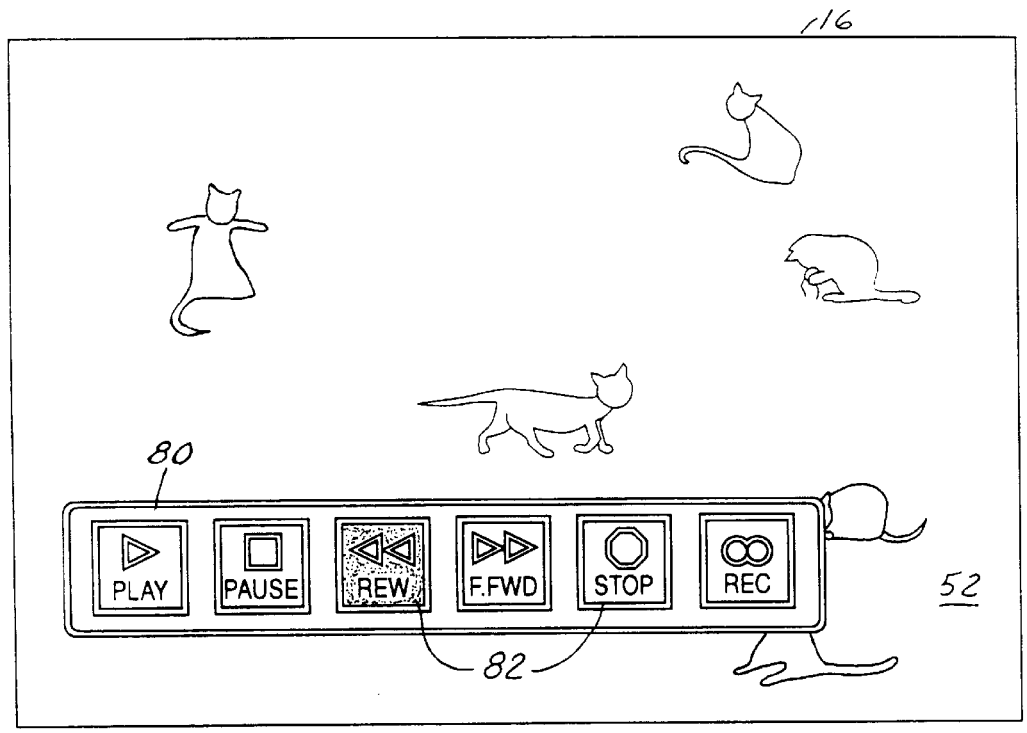
FIG. 9 illustrates a VCR program and VCR control panel displayed on the display screen of the HE device when the HE device is in the VCR mode.
Figure 10:
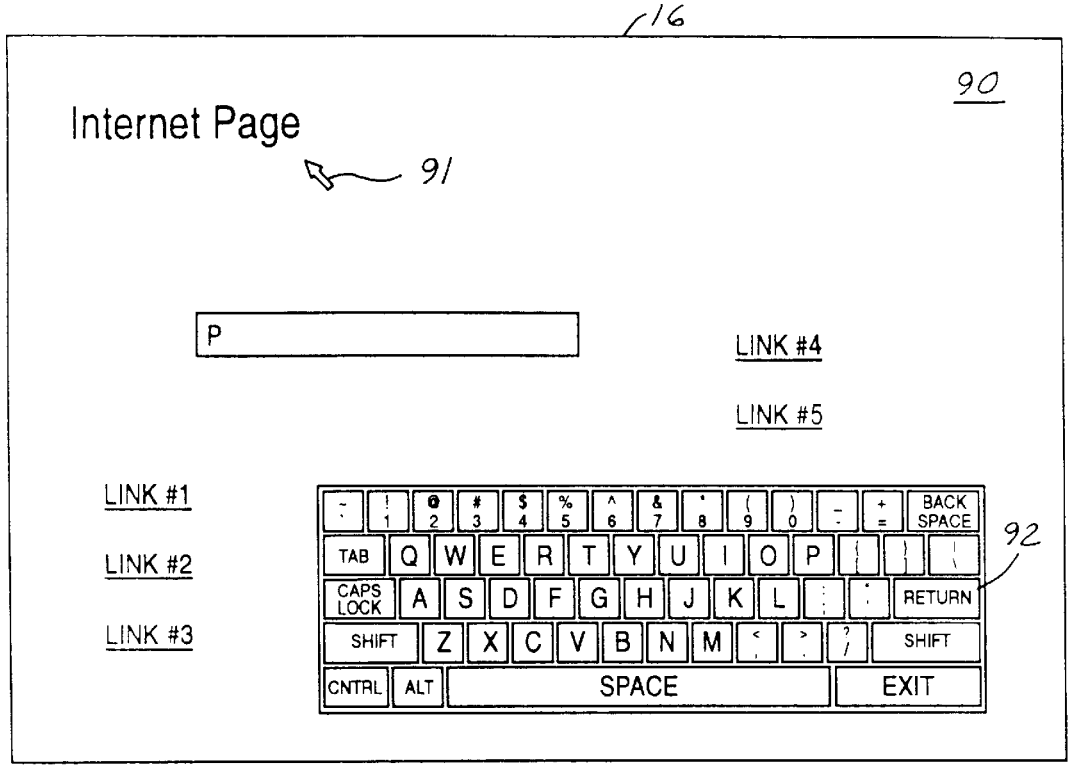
FIG. 10 illustrates an Internet page and on-screen keyboard displayed on the display screen of the HE device when the HE device is in the Internet browsing mode.
Figure 11:
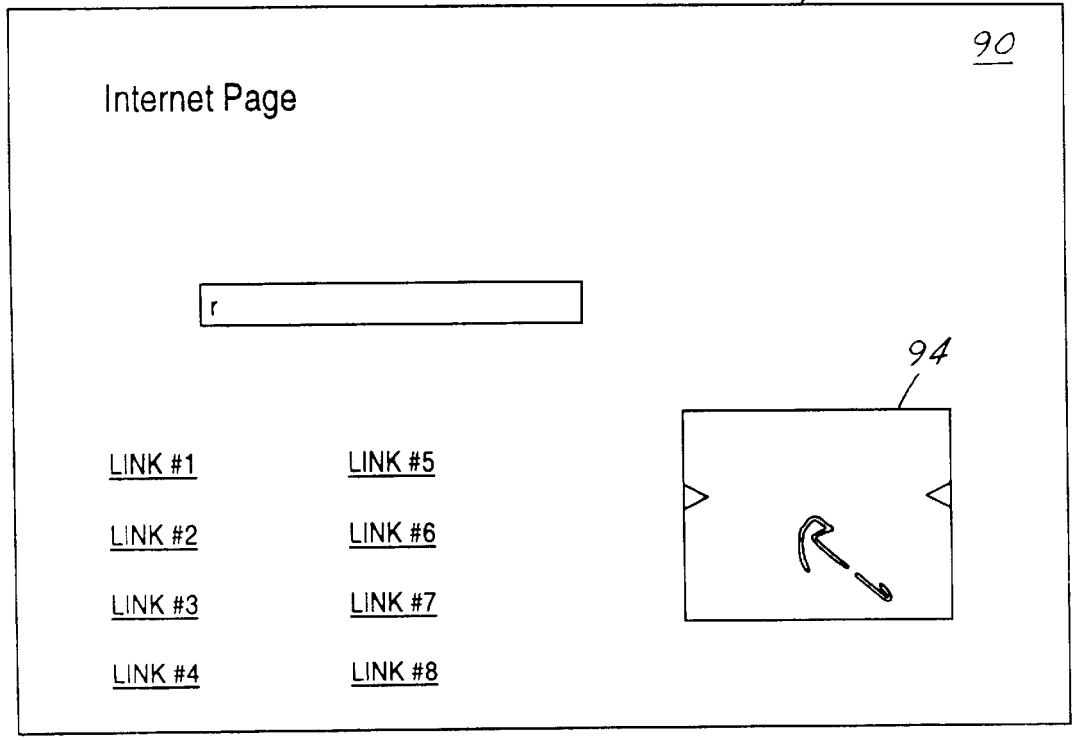
FIG. 11 illustrates an Internet page and a graphical entry screen displayed on the display screen of the HE device when the HE device is in the Internet browsing mode.

In addition to entering text by using on-screen keyboard 92, the operator may also enter text by writing letters using touch pad 12. As shown in FIG. 9, a graphical entry screen 94 is displayed on Internet page 90 in response to the operator pressing write button 24e of remote control 13. Graphical entry screen 94 displays letters entered by the operator touching touch pad 12. The area of touch pad 12 is mapped absolutely to the area of graphical entry screen 94. In operation, the operator touches touch pad 12 to sketch out a character such as the letter "R" shown in FIG. 11. After sketching out the character the operator presses the select button 24a of remote control 13 to enter the character into the input area of Internet page 90. Controller 14 uses character recognition software to convert the handwritten letter to text and then enters the text into the input area of Internet page 90.

Figure 12A:
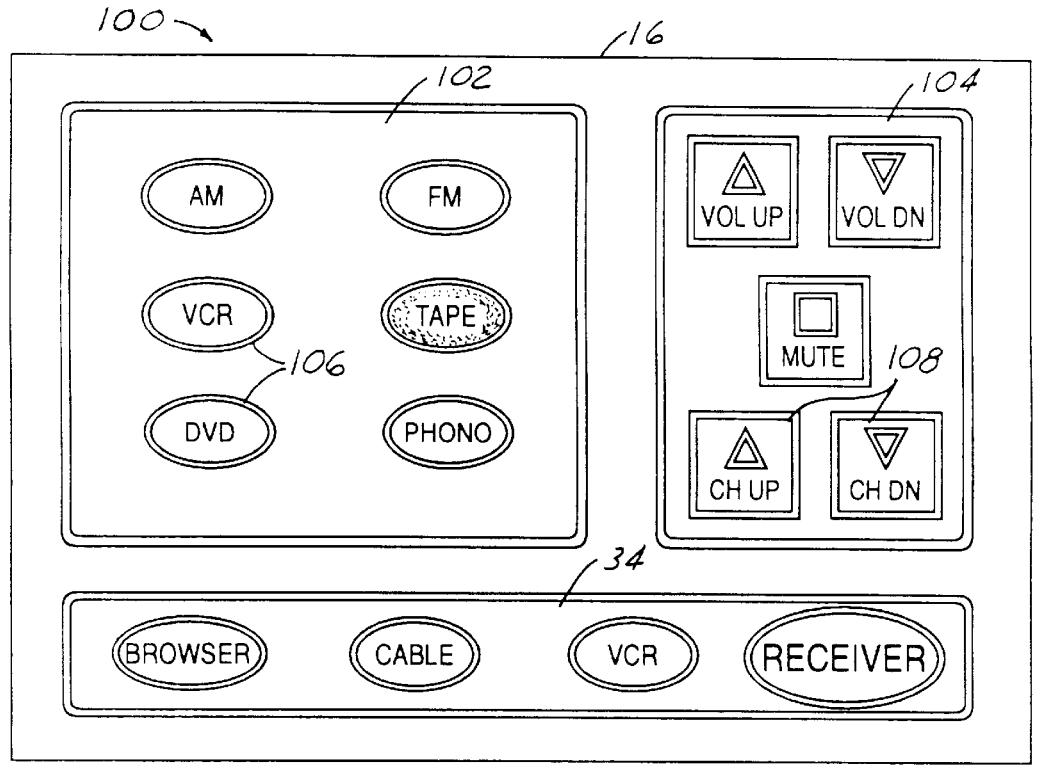
FIG. 12A illustrates an audio receiver control panel displayed on the display screen of the HE device when the HE device is in the audio receiver mode.

In the audio receiver mode, the HE device functions as a stereo receiver for playing audio signals and display screen 16 displays an audio receiver control panel 100 as shown in FIG. 12A. Audio receiver control panel 100 includes a receiver mode menu 102, a receiver control menu 104, and HE device operating panel 34. Receiver mode menu 102 includes a plurality of mode buttons 106 corresponding to a receiver mode. For instance, modes of the receiver include AM and FM radio, tape, phonograph, compact disc, and the like. Receiver control menu 104 includes control buttons 108 for controlling the volume and changing the radio stations in the audio receiver mode.

Figure 12B:
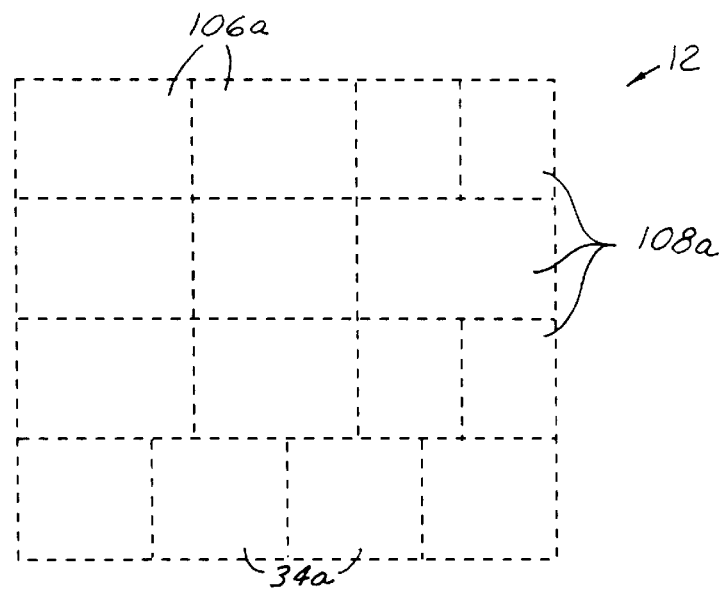
FIG. 12B illustrates the virtual control areas of the touch pad mapped to the audio receiver control panel displayed on the HE device.

Referring now to FIG. 12B with continual reference to FIG. 12a, the area of audio receiver control panel 100 is mapped to the area of touch pad 12. Each menu of audio receiver control panel 100 corresponds to a respective portion of touch pad 12. As shown in FIG. 12B, touch pad 12 is broken down into three control areas corresponding to receiver mode menu 102, receiver control menu 104, and HE device operating panel 34 of audio receiver control panel 100. Each control area of touch pad 12 has associated subareas corresponding to mode buttons 106, control buttons 108, and HE device selections of operating panel 34 in the audio receiver control panel 100. For instance, the operator touches a virtual control area 106a in touch pad 12 to highlight a mode button 106 in receiver mode menu 102, a virtual control area 108a to highlight a control button 108 in receiver control menu 104, and a virtual control area 34a to highlight a selection of operating panel 34. The operator may then select a highlighted button using select button 24a of remote control 13.

Figure 13:
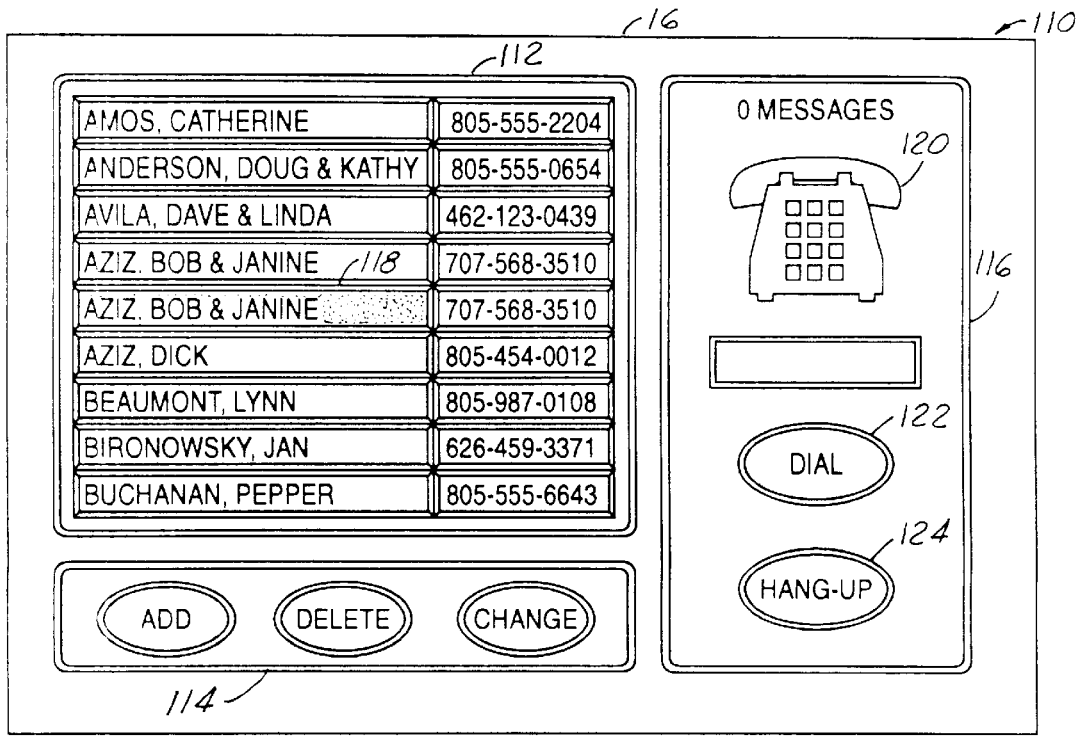
FIG. 13 illustrates an Internet telephony control panel displayed on the display screen of the HE device when the HE device is in the Internet telephony mode.

As mentioned above, main menu 30 further includes an email panel 38 and an Internet telephony panel 40. An HE device such as an enhanced TV provides the operator with the ability to communicate email and Internet telephony messaging. In the Internet telephony mode, the HE device functions as a telephone. Display screen 16 displays an Internet telephony control panel 110 as shown in FIG. 13. Internet telephone control panel 110 includes a telephone directory menu 112, a telephone directory control panel 114, and a telephone operating panel 116. The area of telephone control panel 110 is mapped to the area of touch pad 12. Each menu of telephone control panel 110 corresponds to a respective portion of touch pad 12. For instance, the operator touches the upper left portion of touch pad 12 to highlight a telephone entry 118 in telephone directory menu 112. The operator may then select the highlighted telephone entry by using select button 24a of remote control 13.

Figure 14:
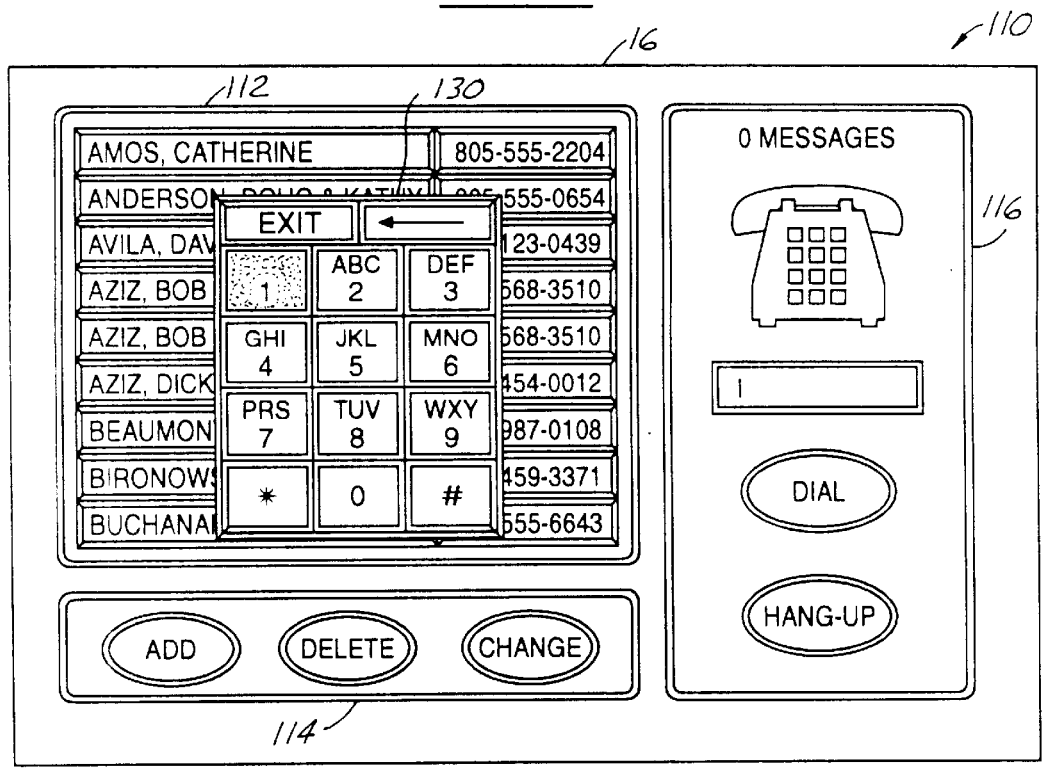
FIG. 14 illustrates an on-screen numerical keyboard displayed on the display screen of the HE device when the HE device is in the Internet telephony mode.

The operator may open received telephone messages by touching the area of touch pad 12 corresponding to telephone message area 120. In response, the HE device plays the recorded audible message. The operator may select a stored telephone number 118, dial the selected telephone number 122, talk and listen to the called party, and then hang up 124. To enter a telephone number that is not stored, the operator selects dial 122 and then enters the desired telephone number using an on-screen numerical keyboard 130 displayed on display screen 16 as shown in FIG. 14.

Figure 15:
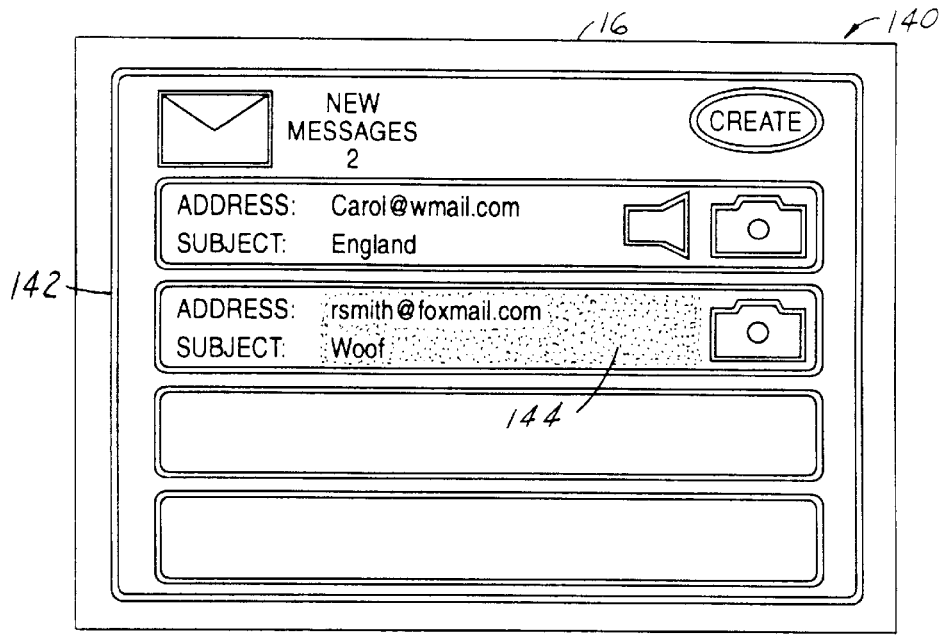
FIG. 15 illustrates an email panel displayed on the display screen of the HE device when the HE device is in the email mode.

In the email mode, the HE device communicates email messages. Display screen 16 displays an email panel 140 as shown in FIG. 15. Email panel 140 includes an email directory menu 142. The area of email directory menu 142 is mapped to the area of touch pad 12. Each email entry of email directory menu 142 corresponds to a respective portion of touch pad 12. For instance, the operator touches the middle portion of touch pad 12 to highlight an email address entry 144 in email directory menu 142. The operator may then select the highlighted email entry by using select button 24a of remote control 13.

Figure 16:
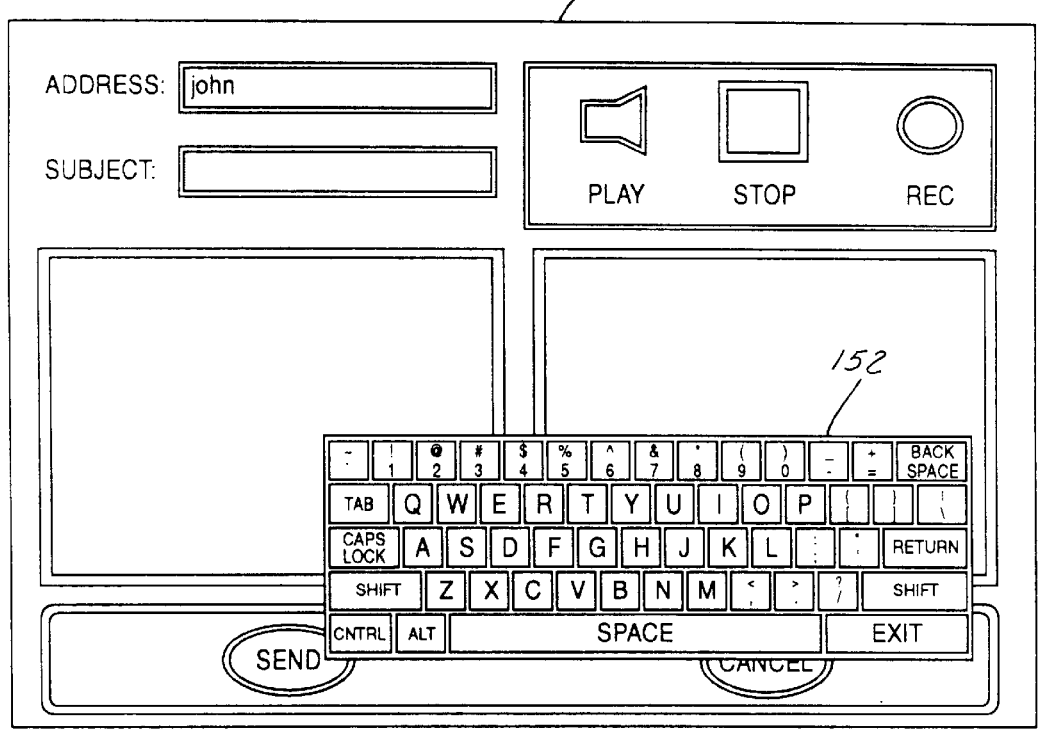
FIG. 16 illustrates an email messaging panel and on-screen panel displayed in the display screen of HE device.
Figure 17:
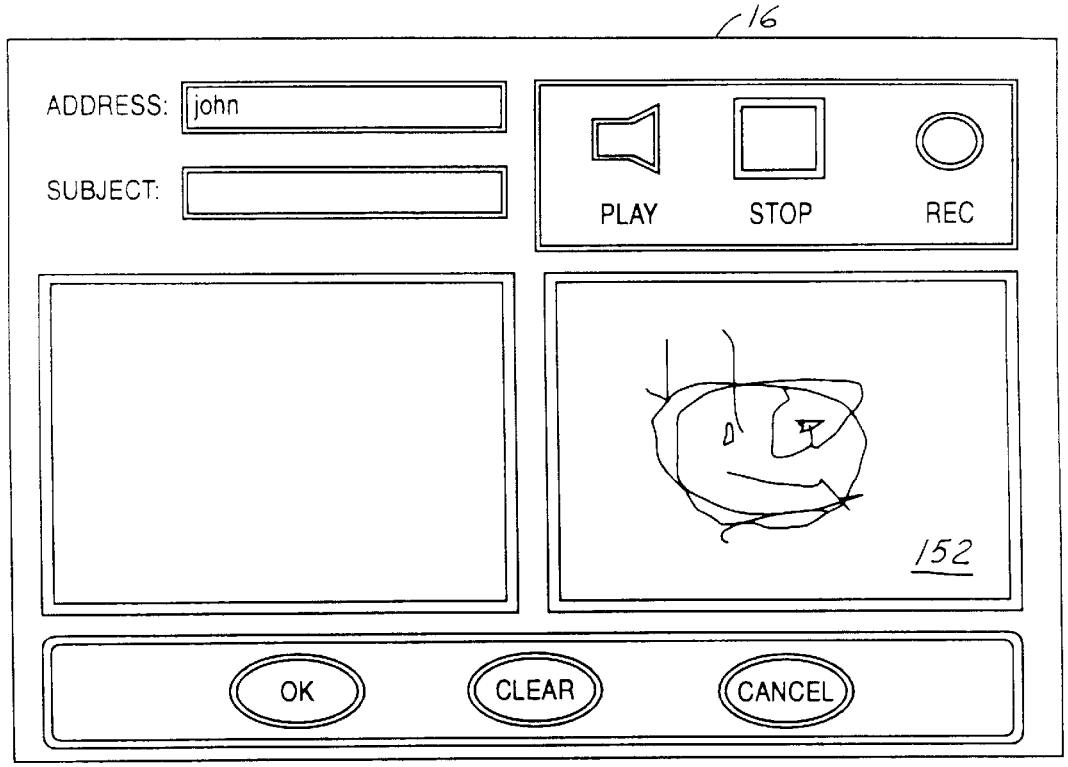
FIG. 17 illustrates the email messaging panel having a writing area displayed in the display screen of the HE device.

Upon selecting the highlighted email entry display screen 16 displays an email messaging panel 150 as shown in FIG. 16. The operator uses email messaging panel 150 to send email messages including text, drawings, voice clips, photographs, and the like. The area of touch pad 12 is mapped to email messaging panel 150 such that there is a one-to-one correspondence between each location of the touch pad and the email messaging panel in the same manner with reference to the other panels and menus described above. The operator may enter text by using on-screen keyboard 152 in the same manner described above with reference to the other on-screen keyboards. The operator may enter writing or drawings into a writing area 152 of email messaging panel 150 as shown in FIG. 17 by using touch pad 12. Photographs may be copied to writing area 152 and then edited by using touch pad 12. In essence, touch pad 12 enables the operator to write an email message. For example, the operator may write his signature to electronically sign for purchases made via Internet shopping, on line banking, signature input, or simply handwrite a personalized email message.

During operation of the HE device, the switching between the absolute mode and the relative mode is context sensitive. The operator will note that during relative operation a cursor appears on display screen 16 and in absolute mode items, links, and the like will be highlighted when selected. The relative mode may be used for virtual screens that are larger than can be displayed on the display screen 16 at once. A typical application that uses the relative mode is the Internet browser. The functionality of a relative cursor allows for multiple strokes to move the cursor. However, if the cursor is against the sides of the display screen 16 the cursor will move the display like a window over the larger document (i.e., pan and scroll) in the direction of the stroke across the touch pad 12. Once the cursor is placed over an object and the object is selected the mode may change based on the context. If the selected item were a button type the button is depressed. If the selected item is a text entry based on user preferences an on-screen keyboard of a character recognizer absolute menu pops up. Upon the input of text the system closes the text input screen and returns to the relative mode for the Internet browser. Once the Internet browser or other application requiring the larger display area is closed the menu would return to the absolute mode.

Figure 18:
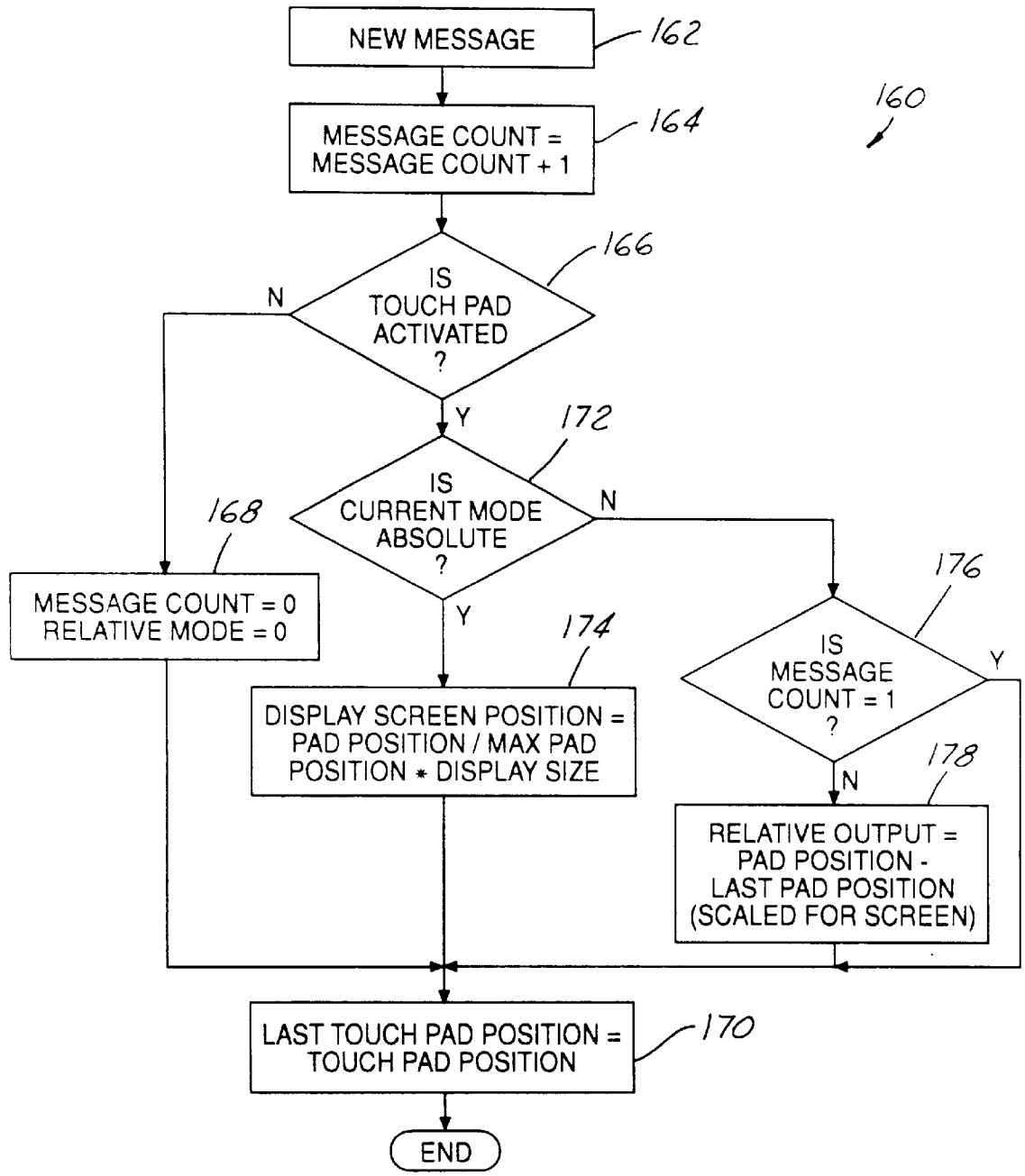
FIG. 18 illustrates a flow chart describing operation of the switching between absolute and relative modes of the display screen of the HE device.

FIG. 18 illustrates a flow chart 160 describing operation of the switching between absolute and relative modes of display screen 16 according to an embodiment of the present invention. Flow chart 160 begins with receiving a new message as shown in block 162 and then incrementing the message count as shown in block 164. Decision block 166 then determines if touch pad 12 is activated. If not, the message count is set to zero and the relative move is set to zero as shown in block 168. The pad position is then equal to the last touch pad position as shown in block 170.

If the touch pad is activated, then decision block 172 determines if the current mode is the absolute mode. If yes, then the display screen position is equal to the touch pad position divided by the maximum touch pad position multiplied by the display size as shown in block 174. If not, then decision block 176 determines if the message count is equal to one. If not, then the relative output is equal to the touch pad position minus the last touch pad position as shown in block 178. The touch pad position is then equal to the last touch pad position as shown in block 170.

Figure 19:
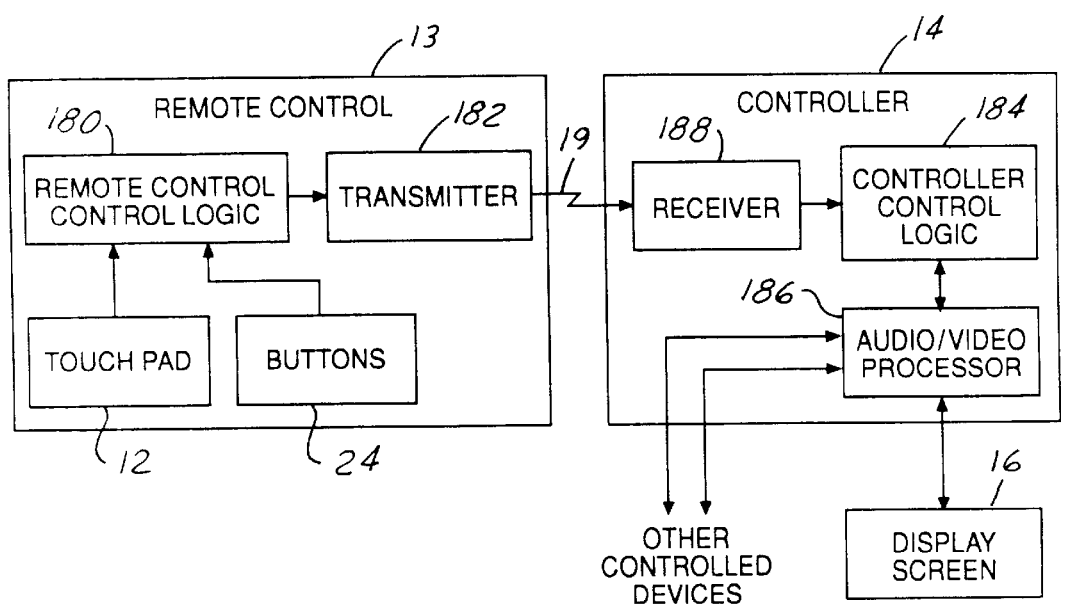
FIG. 19 illustrates a block diagram a remote control system in accordance with the present invention.

FIG. 19 illustrates in further detail remote control system 10 in accordance with the present invention. Remote control 13 includes control logic 180 operable with touch pad 12, control buttons 24, and a transmitter 182. Control logic 180 is embodied as a microprocessor and memory. Controller 14 includes control logic 184 operable with an audio/video processor 186 and a receiver 188. Receiver 188 receives signals from transmitter 182 and passes them to control logic 184. Control logic 184 is also embodied as a microprocessor and memory. In response to the signals received from transmitter 182, control logic 184 controls audio/video processor 186 accordingly. In response, audio/video processor 186 controls display screen 16 and other controlled devices as a function of the received signals.

Thus it is apparent that there has been provided, in accordance with the present invention, a remote control having a touch pad mapped to the screen of a home entertainment (HE) device to create a virtual touch screen for enabling an operator to control the HE device that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A virtual touch screen for controlling a home entertainment device without the use of cursors, the virtual touch screen comprising:

a remote control touch pad having a pad width and a pad height, the touch pad determining a touch width location across the pad width and a touch height location across the pad height in response to an operator touch of the touch pad; and a display screen in remote communication with the touch pad, the display screen having a screen width and a screen height, the display screen displaying an Internet page having a plurality of links for accessing other Internet pages, each link located at a control width location across the screen width and at a control height location across the screen height;

wherein the entire touch pad is subdivided into a number of touch pad portions equal to the number of links of the Internet page such that each and every touch pad portion corresponds to a respective link;

wherein, in response to the operator touch at any location on the touch pad, the link corresponding to the touch pad portion containing the touched location is enabled without the use of a cursor displayed on the display screen based on at least one of (a) and (b), where (a) and (b) are
  (a) the ratio of the pad width and the screen width, the touch width location, and the control width location of each link; and
  (b) the ratio of the pad height and the screen height, the touch height location, and the control height location of each link;

wherein, in response to the operator tracing a touch across different locations of the touch pad, for each touched location of the trace the link corresponding to the touch pad portion containing the touched location of the trace is selected without the use of a cursor displayed on the display screen based on at least one of (a) and (b) such that different links are uniquely selected without the use of a cursor displayed on the display screen as the operator traces the touch across different touch pad portions.

2. A virtual touch screen for controlling a television without the use of cursors, the virtual touch screen comprising:

a remote control touch pad having a pad width and a pad height, the touch pad determining a touch width location across the pad width and a touch height location across the pad height in response to an operator touch of the touch pad; and a television display screen in remote communication with the touch pad, the display screen having a screen width and a screen height, the display screen displaying a cursorless television electronic program guide having a plurality of channel and program grids for controlling the television, each grid located at a control width location across the screen width and at a control height location across the screen height, wherein the display screen is void of cursors such that cursors are absent from being displayed on the display screen;

wherein the entire touch pad is subdivided into a number of touch pad portions equal to the number of grids of the television electronic program guide such that each and every touch pad portion corresponds to a respective grid;

wherein, in response to the operator touch at any location on the touch pad, the grid corresponding to the touch pad portion containing the touched location is selected without the use of a cursor displayed on the display screen based on at least one of (a) and (b), where (a) and (b) are
  (a) the ratio of the pad width and the screen width, the touch width location, and the control width location of each grid; and
  (b) the ratio of the pad height and the screen height, the touch height location, and the control height location of each grid;

wherein, in response to the operator tracing a touch across different locations of the touch pad, for each touched location of the trace the grid corresponding to the touch pad portion containing the touched location of the trace is selected without the use of a cursor displayed on the display screen based on at least one of (a) and (b) such that different grids are uniquely selected without the use of a cursor displayed on the display screen as the operator traces the touch across different touch pad portions.

3. A virtual touch screen for controlling a television without the use of cursors, the virtual touch screen comprising:

a television display screen displaying a cursorless television electronic program guide having a number of virtual controls for controlling the television, wherein the display screen is void of cursors such that cursors are absent from being displayed on the display screen; and a remote control in remote communication with the display screen, the remote control having a touch pad, at least a portion of the entire touch pad is subdivided into a number of virtual control regions equal to the number of virtual controls of the television electronic program guide displayed on the display screen, each and every touch pad virtual control region corresponding to one virtual control of the television electronic program guide such that touching the touch pad at any point falling within a touch pad virtual control region enables the virtual control of the television electronic program guide corresponding to the touch pad virtual control region containing the touched point without the use of a cursor displayed on the display screen;

wherein, in response to an operator tracing a touch across different locations of the touch pad falling within the touch pad virtual control regions, for each touched location of the trace the virtual control of the television electronic program guide corresponding to the touch pad virtual control region containing the touched location of the trace is enabled without the use of a cursor displayed on the display screen such that different virtual controls of the television electronic program guide are uniquely enabled without the use of a cursor displayed on the display screen as the operator traces the touch across different touch pad virtual control regions.

4. A virtual touch screen for controlling home entertainment equipment as in claim 3 wherein the touch pad virtual control regions vary in response to changing virtual controls on the display screen.

5. A virtual touch screen for selecting Internet page links without the use of a cursor, the virtual touch screen comprising:

a display screen displaying an Internet page having a number of links for accessing other Internet pages; and a remote control in remote communication with the display screen, the remote control having a touch pad, at least a portion of the entire touch pad is subdivided into a number of virtual control regions equal to the number of links of the Internet page displayed on the display screen, each and every touch pad virtual control region corresponding to one link of the Internet page displayed on the display screen such that touching the touch pad at any point falling within a touch pad virtual control region enables the link corresponding to the touch pad virtual control region containing the touched point without the use of a cursor displayed on the display screen;

wherein, in response to an operator tracing a touch across different locations of the touch pad falling within the touch pad virtual control regions, for each touched location of the trace the link corresponding to the touch pad virtual control region containing the touched location of the trace is enabled without the use of a cursor displayed on the display screen such that different links are uniquely enabled without the use of a cursor displayed on the display screen as the operator traces the touch across different touch pad virtual control regions.

\* \* \* \* \*